May 29, 1951     F. M. BROWN ET AL     2,554,557
VENT PLUG AND LIQUID LEVEL INDICATOR FOR BATTERIES
Filed Jan. 10, 1948
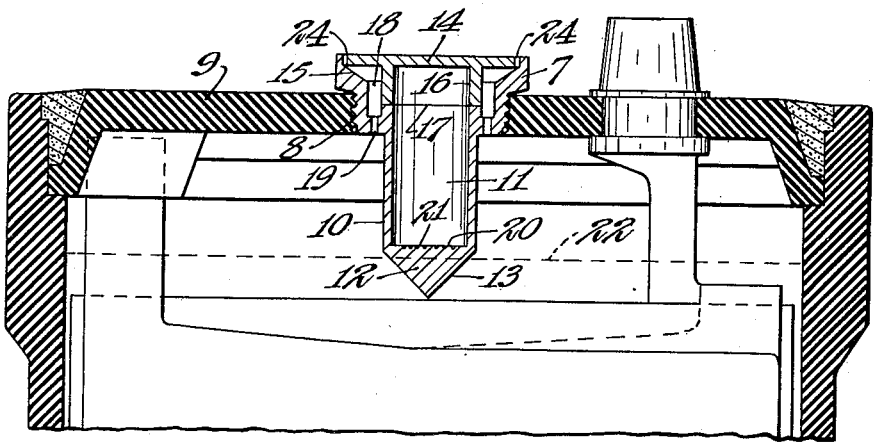
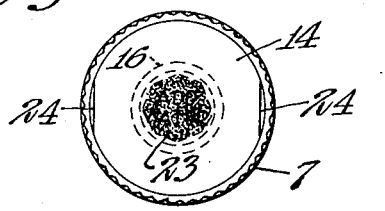
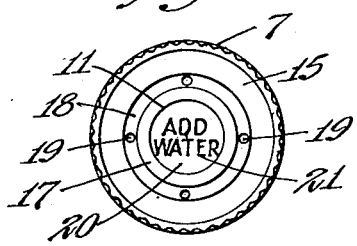
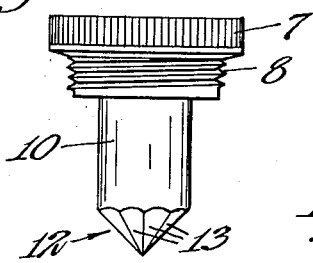
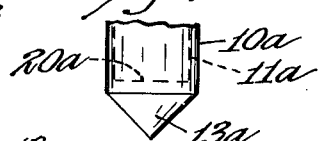
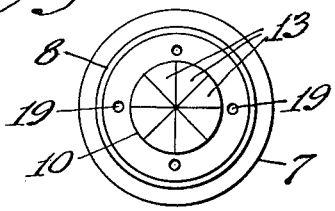
INVENTORS
Frank M. Brown
BY Kenneth Dawkins
John E. Thyber
ATTORNEY Patented May 29, 1951

2,554,557

UNITED STATES PATENT OFFICE 2,554,557

VENT PLUG AND LIQUID LEVEL INDICATOR FOR BATTERIES

Frank M. Brown, St. Paul, Minn., and Kenneth Dawkins, Kingston, Ontario, Canada, assignors to Gould-National Batteries, Inc., a corporation of Delaware Application January 10, 1948, Serial No. 1,584

3 Claims. (Cl. 136—182)

This invention relates to improved filling and vent plugs for storage batteries and particularly to a device of this class having an improved liquid level indicator which facilitates determinations of whether the battery contains the proper amounts of electrolyte and when liquid should be added.

It is an object of our invention to provide an unusually inexpensive and reliable vent plug and liquid level indicator of the class described.

Another object is to provide a vent plug with a hollow, translucent liquid level indicator having a lower end adapted to be immersed in the electrolyte and so shaped as to reflect upwardly light passing down through the open central chamber whereby maximum illumination and unusually clear indications of the liquid level are shown when the plug is viewed from above.

A further and particular object is to construct a vent plug and integral level indicator entirely from translucent material wherein a large central chamber is provided for the passage of light, and the chamber is sealed off from the vent passages and protected from deposits of foreign matter to insure efficient transmission of light to and from a reflecting surface or surfaces at the lower end of the indicator.

A further object is to provide a device of the class described with a legend disposed in novel relation to the light reflecting surfaces whereby the need for additional liquid is clearly indicated when the surface of the liquid is reduced to a predetermined elevation and the legend is protected from obscuring deposits of foreign material and against exposure to the electrolyte.

Our invention also includes certain other novel features of construction which will be more fully pointed out in the following specification and claims.

Referring to the accompanying drawing, which illustrates by way of example and not for the purpose of limitation, a preferred form of our invention:

Figure 1 is a central vertical section through one of our improved vent plugs in place in the cover opening of a storage battery cell of common type;

Fig. 2 is a top plan view of one of our improved plugs, showing the dark central area which appears when the lower end surfaces are submerged in the battery electrolyte;

Fig. 3 is a side elevational view of the plug and indicator;

Fig. 4 is a lower end view of the same;

Fig. 5 is a top plan view showing the body of the plug with the top closure member removed;

Fig. 6 is a central vertical section through the separate top closure member, and Fig. 7 is a side elevational view of the lower end portion of an alternate form of liquid level indicator.

In the drawing, the numeral 7 indicates a hollow body member of our improved plug which is formed with a threaded portion 8 adapted to fit in the filling opening of a battery cover 9. Extending downward from the body 7 and integral therewith is a liquid level indicator 10 having thin walls defining a large central chamber 11 for the passage of light to and from a lower end portion 12 of the indicator. As shown in Figs. 1, 3 and 4, the lower end portion 12 is of pyramid shape and has a plurality of reflecting surfaces 13 formed thereon to reflect upwardly light passing down through the central chamber 11. Any number of suitable reflecting surfaces may be formed on the end portion 12 or, as shown in Fig. 7, a reflecting surface in the shape of a right angle cone 13a may be provided to reflect light up a central chamber 11a in a level indicator 10a which is similar to the indicator 10 except in the matter of the shape of the reflecting surfaces.

Our improved vent plug and liquid level indicator is preferably constructed from a clear plastic such as polystyrene or methyl methacrylate. Such plastics have desirable molding characteristics as well as sufficient strength and durability to make it feasible to construct the plug with thin, translucent walls, thereby minimizing the cost of material required for construction of the plug and indicator and improving the visibility of the level indications. Other suitable translucent materials which are not subject to attack by the acid or other electrolyte contained in the battery, e. g., glass, quartz or suitable plastics not hereinbefore named may be employed in the construction of our device.

A closure member 14 for the top of the plug is also constructed from a transparent or translucent material of the character described. The periphery of the member 14 rests on an annular shoulder 15 formed in the body 7. Projecting downward, concentric with the periphery of the member 14 and integral therewith, is an annular flange 16 which is fastened in sealing relation to and in continuation of the walls of the indicator 10, along a top surface 17 of the walls. The lower end portion of the flange 16 may be fastened and sealed in engagement with the surface 17 by the use of suitable cement or solvent whereby the chamber 11 and the extension thereof defined by the flange 16 and member 14 are effectively sealed against the entry of electrolyte or foreign matter of any kind, or the flange 16 may be sealed and fastened to the surface 17 merely by heat fusion, as by holding the heat softened members together under compression until they fuse and harden in united relation.

An annular chamber 18 is formed in the body 7 at the outer periphery of the flange 16 and communicating with the bottom of this chamber is a plurality of vent passages 19. Other vent passages 24 are formed in the top closure member 14 through which gases may escape from the battery and air may enter. In order to afford a clear view into the chamber 11 and thence to the reflecting surfaces 13, the inner and outer surfaces of the member 14 above the chamber 11 are polished as are the top surface 20 and surfaces 13 of the end portion 12. The cone surface 13a and horizontal surface 20a of the indicator shown in Fig. 7 are also polished.

A suitable legend 21, e. g., "Ad Water," is displayed on the surface 20 and a similar legend may be displayed on the surface 20a (Fig. 7). The legend is preferably embossed on or impressed into the surface which is illuminated only when the level of electrolyte is below the surfaces 13 (or 13a, Fig. 7). We prefer to form the legend directly in the transparent plastic material, without added color to define the characters. By so forming the legend we cause it to be obscured or "blacked out" when the surfaces 13 or 13a are submerged in the electrolyte. The reflecting surfaces 13 and 13a are disposed to be immersed in the battery electrolyte when the latter is approximately at its maximum elevation indicated by the numeral 22 in Fig. 1. As the electrolyte evaporates, its surface elevation is reduced until it is below the lower extremity of the surfaces 13 or 13a thereby causing the legend 21 to appear clearly when viewed through the transparent closure member 14. When the legend 21 is clearly readable, or when the dark area 23 disappears, water or electrolyte should be added. To add liquid, the plug is removed from the filling opening. At all higher levels, the presence of liquid in contact with the reflecting surfaces 13 or 13a is indicated by the appearance of the dark area at the center of the plug as viewed from above and without removing the plug from the battery. For example, the presence of an adequate supply of electrolyte is indicated by the appearance of a dark area 23 (Fig. 2) which is defined by the intersection of the liquid surface with the reflecting surfaces 13 as reflected to the top of the closure member 14. Such dark area substantially completely obscures the legend 21 until further evaporation reduces the liquid level and causes the surfaces 13 or surface 13a to be uncovered. When the surfaces 13 are above the level of the liquid, light passing down the indicator is reflected from one of the surfaces 13 to the opposite one and then up to the eye of the observer above the plug thereby giving a bright appearance over the entire indicator surface 20. The dark area indicating the immersion, either in whole or in part, of the surfaces 13 is due to the refraction of the light rays downward into the liquid from the submerged portions of the surfaces 13. The conical reflecting surface 13a shown in Fig. 7 operates in a similar manner to indicate the elevation of the liquid surface in the battery cell.

An observer having knowledge that the appearance of a dark area indicates the presence of liquid at substantially normal elevation does not require the further indication of the legend. Accordingly, the legend is not essential to the operation of our indicator, but constitutes an advantageous feature which makes the device clearly understandable by observers having no knowledge of or instruction in the operation of our device.

It will be evident that it is unnecessary to remove the plug to determine whether liquid should be added to the battery electrolyte. Much time is thereby saved, particularly where a large number of cells must be inspected. An unusually clear indication of the level is obtained by reason of the fact that there is a minimum obstruction to the passage of light through the chamber 11 to and from the reflecting surfaces and also because of the unusually large area of the reflecting surfaces provided on our indicator.

This application is a continuation-in-part of our application Serial No. 768,960, filed August 16, 1947, which has been abandoned.

Having described our invention, what we claim as new and desire to protect by Letters Patent is:

1. A vent plug and liquid level indicator for storage batteries comprising, a vent chamber having top and bottom walls formed with vent openings and an outer side wall formed to close an opening in a battery cover, a relatively large, completely closed and sealed central chamber formed from transparent material and having a lower end surface adapted to be submerged in the battery electrolyte and shaped to reflect upwardly light passing down through the hollow interior of said chamber, said central chamber extending to the top of said vent chamber and having upper end and lower end closures, a legend located within the hollow interior of said sealed central chamber at an elevation above the lower end thereof, said legend being illuminated by light reflected from said lower end surface and being readable through said upper end closure when the liquid in the battery is below said lower end surface and being obscured when said lower end surface is submerged in the battery liquid.

2. A vent plug and liquid level indicator for storage batteries comprising, an annular vent chamber formed from transparent plastic material and having top and bottom walls formed with vent openings and an outer side wall formed to close an opening in a battery cover, a relatively large, completely closed and sealed central chamber formed from transparent material integrally with the bottom wall of said annular vent chamber and having a lower end surface adapted to be submerged in the battery electrolyte and shaped to reflect upwardly light passing down through the hollow interior of said chamber, said central chamber extending to the top of said vent chamber and having upper end and lower end closures and a legend adapted to indicate the need for adding liquid to the battery electrolyte carried by the upper surface of said lower end closure within said central chamber, said legend being illuminated by light reflected from said lower end surface and being readable through said upper end closure when the liquid in the battery is below the said lower end surface and being obscured when said lower end surface is submerged in the battery liquid.

3. A vent plug and liquid level indicator for storage batteries comprising, an annular vent chamber having top and bottom walls formed with vent openings and an outer side wall formed to close an opening in a battery cover, a relatively large, vertically elongated central chamber formed from transparent material and having relatively thin side walls and a lower end surface adapted to be submerged in the battery electrolyte and shaped to reflect upwardly light passing down through the hollow interior of said chamber, said central chamber being completely closed and sealed and extending to the top of said vent chamber and having upper end and lower end closures, said upper end closure being integral with the top wall of said vent chamber and the vent chamber having an inner circumferential wall portion comprising an annular flange formed integrally with said upper end closure and depending therefrom in continuation of and in sealed relation to the side walls of said central chamber, whereby the joint between said annular flange and said walls is substantially concealed at the inner circumference of said annular vent chamber.

FRANK M. BROWN.
KENNETH DAWKINS.

REFERENCES CITED

The following references are of record in the file of this patent:

UNITED STATES PATENTS

| Number | Name | Date |
|---|---|---|
| 461,370 | Seidensticker | Oct. 13, 1891 |
| 1,883,971 | Kryzanowsky | Oct. 25, 1932 |
| 2,123,479 | Spencer | July 12, 1938 |

FOREIGN PATENTS

| Number | Country | Date |
|---|---|---|
| 412,803 | Great Britain | July 5, 1934 |